May 26, 1953  G. C. WERNER  2,639,595
THRUST COUPLING
Filed June 10, 1946  3 Sheets-Sheet 1
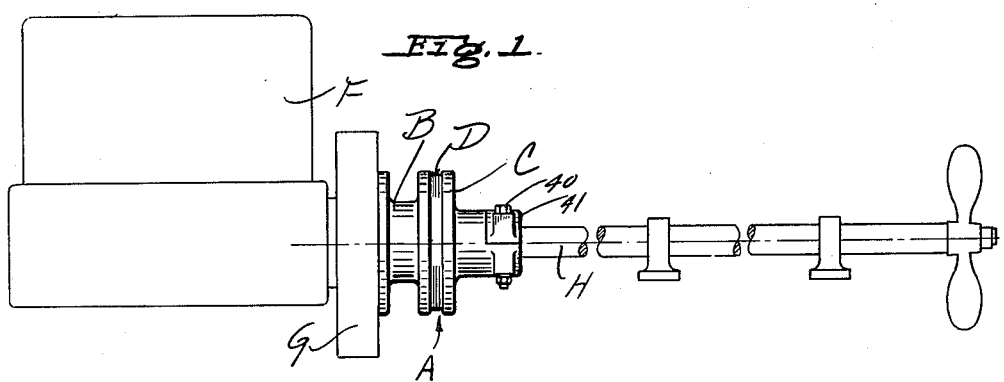
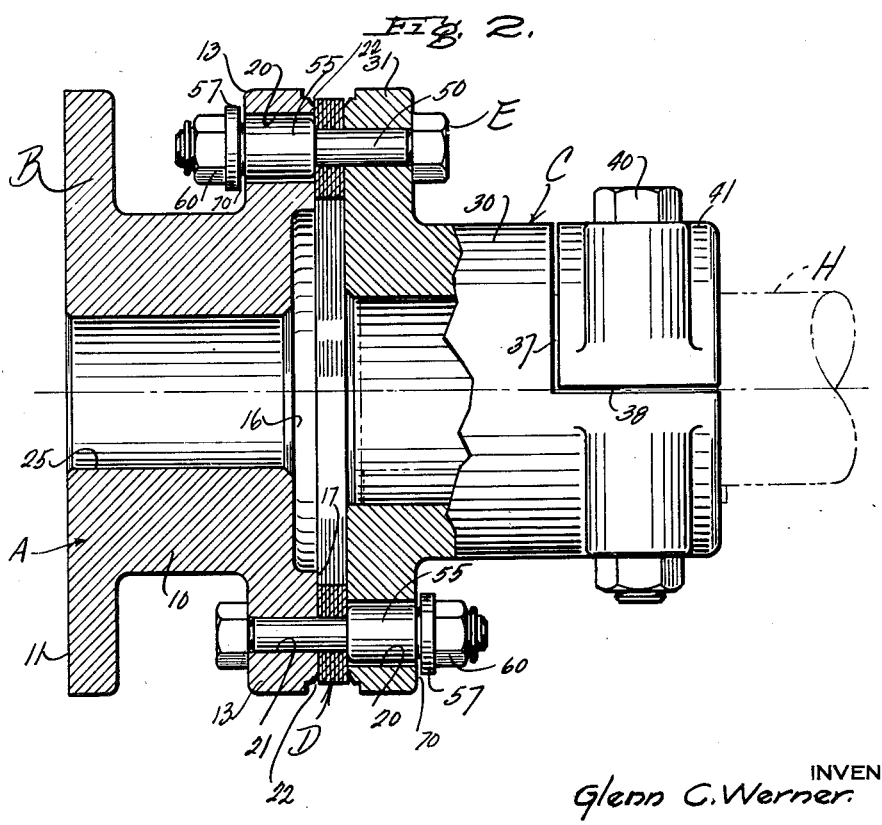
INVENTOR.
Glenn C. Werner.
BY Lancaster, Adams & Rommel
ATTORNEYS.

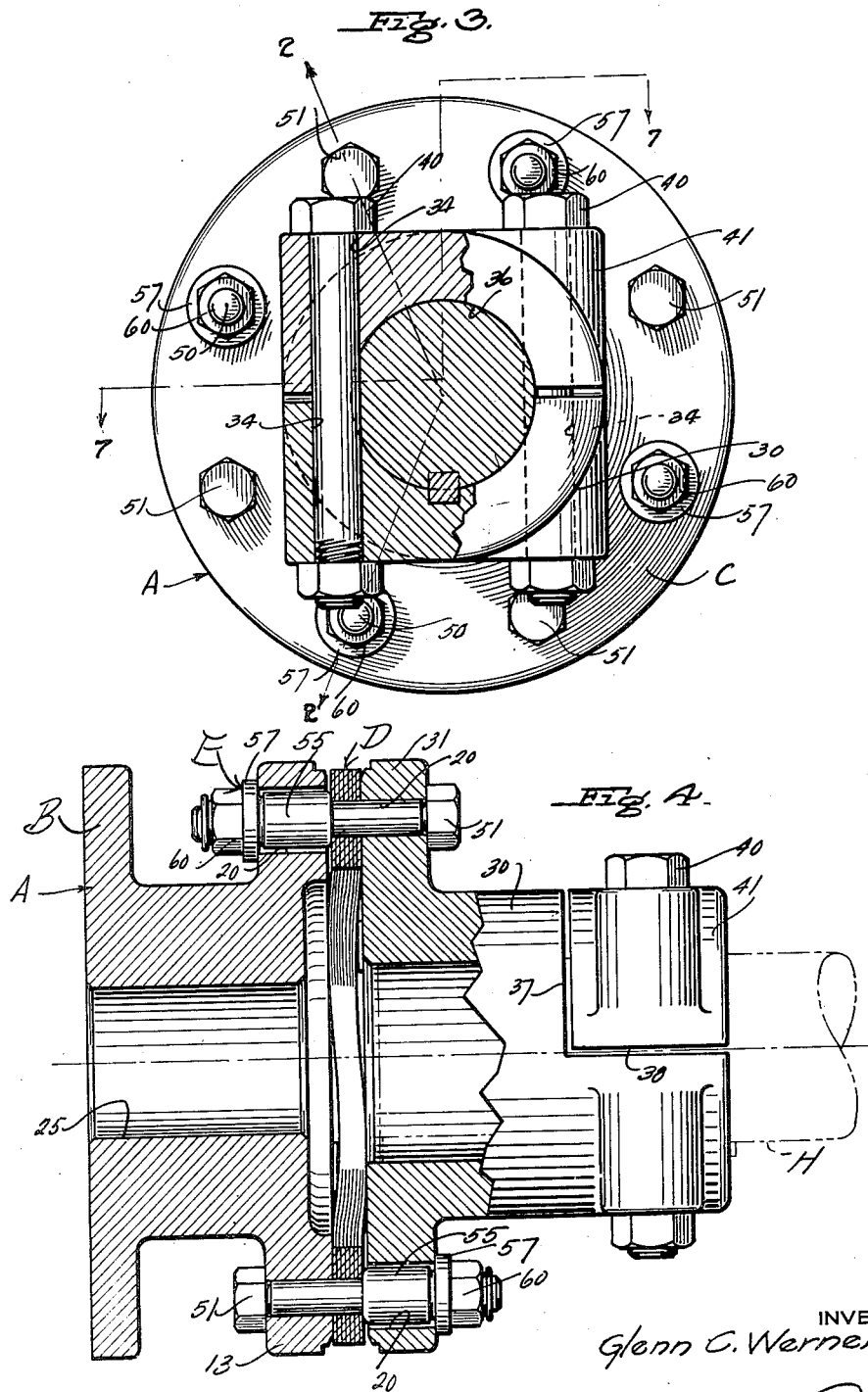

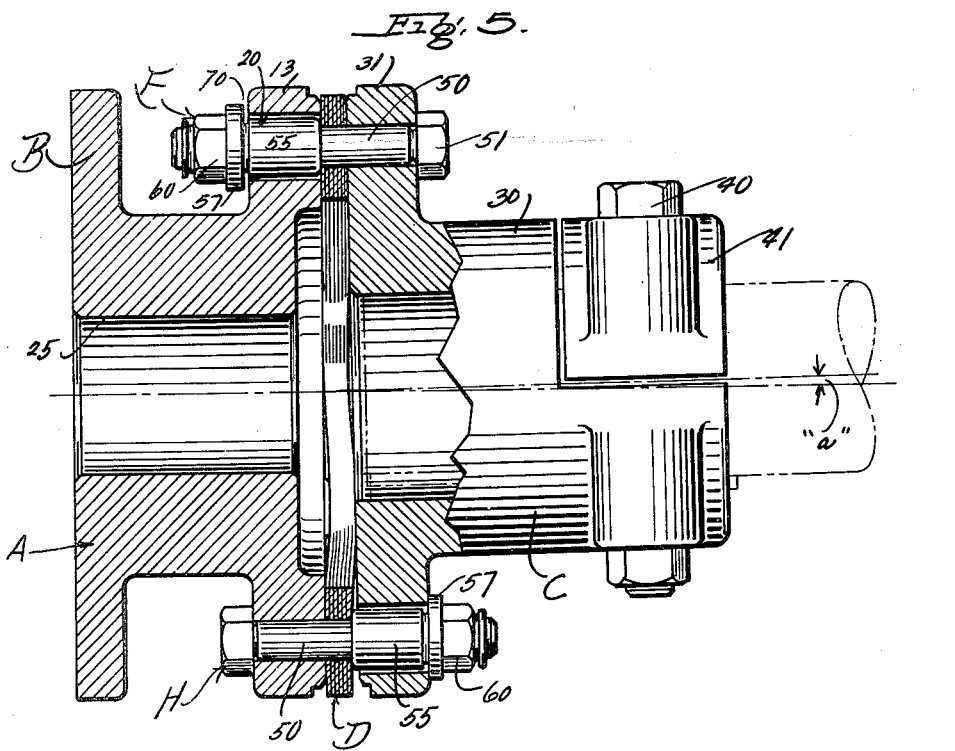
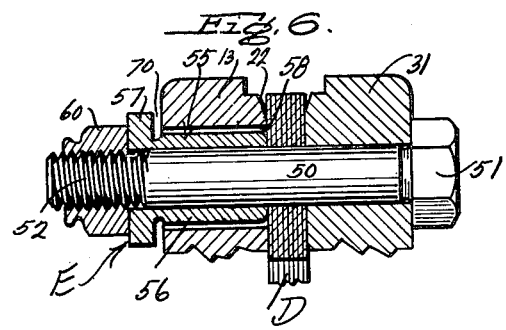
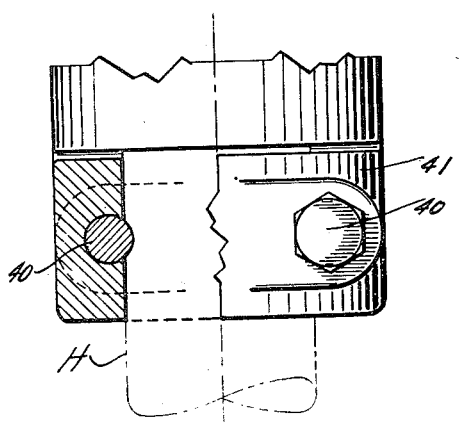

Patented May 26, 1953

2,639,595

UNITED STATES PATENT OFFICE 2,639,595

THRUST COUPLING

Glenn C. Werner, Warren, Pa.

Application June 10, 1946, Serial No. 675,741

5 Claims. (Cl. 64—13)

This invention relates to improvements in thrust couplings adapted for use between drive and driven shafts.

The primary object of this invention is the provision of a flexible type of coupling particularly well adapted for marine use to take care of misalignment of drive and driven shafts. While the coupling is used primarily on small watercraft, it is not to be limited thereto. Most marine engines have a clutch, gear reducer, reversing gears and thrust bearing built into a unit bolted to the fly-wheel housing. This unit usually has a flanged output shaft to which an adapter flange of a coupling is bolted. In most installations in the past it has been the practice to bolt one section of shafting rigidly to the propeller shafting and to depend upon bending of the shaft to take care of misalignment conditions due to hull deflection, propeller strain, or other conditions tending to misalign the shafts. In some cases a plurality of couplings have been used to take care of these conditions. The present coupling is adapted to be used in the shafting line between the engine setup and the propeller and only one coupling is necessary to take care of misalignment and other conditions.

Others objects and advantages of the invention will be apparent during the course of the following detailed description.

In the accompanying drawings, forming a part of this specification, and wherein similar reference characters designate corresponding parts throughout the several views—

Figure 1 is a diagrammatic view showing the position of the improved coupling with respect to the engine assemblage and the propeller.

Figure 2 is a partial longitudinal cross sectional view of the coupling taken substantially on the line 2—2 of Figure 3 showing the relation of the parts when the shafting at opposite sides of the coupling is in proper alignment for transmitting a forward thrust.

Figure 3 is an end view of the coupling, partly in section, showing how the driven shaft is connected.

Figure 4 is a partial longitudinal sectional view similar to Figure 2 but showing the position of the coupling parts and discs when the shafting is in alignment, with reverse drive.

Figure 5 is a view of the coupling parts similar to Figures 2 and 4, but showing the position of the coupling parts and flexing discs when the shafting is in maximum angular misalignment.

Figure 6 is a fragmentary cross sectional view taken through the coupling parts showing a bolt connecting structure.

Figure 7 is a fragmentary cross sectional view taken substantially on the line 7—7 of Figure 3.

In the drawings, wherein for the purpose of illustration is shown only a preferred embodiment of the invention, the letter A may generally designate the coupling. It consists of coupling members B and C, a flexing disc set D and bolt assemblages E connecting the coupling parts, or flanges as they are sometimes called, in assembled relation with each other and with the disc set D.

The coupling member B, or driving flange as it is usually called, is a steel casting or forging, but it may be of other material such as brass or bronze. It includes a body portion 10, a disc connecting flange 13, and a flange 11 adapted to be connected to the prime mover or driving motor F. The flange 11 is always altered for each individual order to suit the specific requirements. Usually it is machined by the installer to suit the particular case, and as shown in Figure 1 it may be connected to a clutch part within a fly-wheel and clutch structure G.

The disc engaging flange 13 is truly concentric and symmetrical. It is machined smooth and is free of bosses. An inner counterbore 16 may be provided for the purpose of effecting a saving in production costs. The annular disc facing projection 17 of the coupling part B has alternate large and small transverse openings 20 and 21 which extend thru the flange 13. The disc contacting surface has been curved slightly at 22 towards the outside periphery of the flange 13 to provide proper clearance in order to avert damage to the disc set when the coupling parts are relatively out of alignment due to angular misalignment.

The openings 20 and 21 receive the bolt assemblages E as has been above described and they alternate with their axes equally angularly spaced. The number of these openings may vary. In the example shown there are four of each in the flange 13. The coupling member B is provided with an axial shaft receiving bore 25.

Referring to the driven flange or coupling member C, its construction is quite similar to the coupling member B. It includes a hub portion 30 provided with a disc contacting flange 31 identical with respect to the disc contacting flange 13 of the coupling part B above described, except that the counterbore 16 of the flange 13 is omitted. Similar reference characters identifying like parts in the flanges 13 and 31 have been shown in the drawings.

The driven flange or coupling member C has a peculiarly shaped hub structure 30 which may be fabricated complete by the manufacturer, but altered by the customer. This is conventional practice in the marine art. The customer drills parallel openings 34 through the hub structure, preferably breaking slightly into the axial bore 36 through the part C. The hub is then sawed at 37 and 38. Bolts 40 are then used to clamp the cap portion 41 to the integral portion of the hub structure 30. The driven shaft, designated at H in Figure 1, is clamped between the integral portion of the hub 30 and the cap 41; the bolts 40, of course, effecting the clamping and keying action.

Referring to the disc set D, the same consists of a plurality of stainless steel ring-shaped discs which will flex laterally. The discs are of the sort used in a coupling such as set forth in U. S. Patent 2,182,711. The discs are each provided with aligning openings therein, to receive shank portions of the coupling flange connecting bolt structures E.

The bolt structures E each consist of a bolt shank 50, such as shown in Figure 6, having a head 51 thereon and a screw threaded end 52 at the opposite end. It furthermore includes a distance piece or sleeve 55 consisting of a body portion 56 and a flange 57 connected to the body portion integrally, preferably at a reduced section. The disc abutting end of the sleeve 56 has a preferably rounded surfacing 58 to prevent injury to the discs as an incident of flexing of the latter. The construction E furthermore includes a nut 60 adapted to clamp against the flanged end of the sleeve structure 55.

Referring to the assemblage of the bolt construction E upon the flanges 13 and 31 of the coupling pieces B and C, the bolt structures E are similarly disposed in alternating arrangement. That is, with their head ends and nut ends of adjacent bolts facing in opposite directions. To that end an opening 21 of one of the coupling part flanges will align with the larger opening 20 of the flange of the other coupling part. In this arrangement the shanks 50 will fit in the small openings or passageways 21 and the sleeve portions 55 fit in the larger openings 20. In each instance the assembly of the bolt structure E is identical. That is, the shank 50 slidably but snugly fits in the passageways 21 with the head end of the bolt against the coupling flange 13 or 31, as the case may be. The nuts 60 are so adjusted on the bolt shanks that they clamp the sleeve 55 securely against the flexible disc structure D, as shown in Figure 6 of the drawings. In this position of parts it will be noted that the external diameter of the sleeve 55 is less than the internal diameter of the passageway or opening 20 so that the sleeve has some lateral movement in its passageway 20. Also, the flanges 57 overlap the adjacent flange of the coupling part with the facing surface in spaced relation, as shown at 70 in Figure 6 and elsewhere from the facing surface of the coupling flange. It will thus be noted that alternating bolts are secured to one coupling part in an arrangement or set which prevents their movement axially with respect to said coupling part but for positive limited movement with respect to the other coupling part and the remaining bolts are reversely applied in a second arrangement or set with respect to the said coupling parts.

With the coupling parts B and C and the disc set assembled by means of the bolt structures E in the relation above mentioned, it will be noted that it is possible under conditions of angular misalignment of the coupling parts B and C for the flange of the coupling part to move towards the flange of the bolt sleeve. This, of course, necessitates flexing of the discs of the set D and under condition of reverse drive the functioning will be the same.

Referring to Figure 2 of the drawings, the coupling part disc sets and bolt structures are shown under a condition of forward drive of the driven shaft by the drive shaft where there is no misalignment of shafting. If the coupling parts are in exact alignment and the thrust is forward, there will be no flexing of the discs and the action of the coupling parts will be to compress the flanges of the coupling parts against the discs. This arrangement is shown in Figure 2.

Where the drive and driven shafts are out of alignment, which frequently occurs, the conditions shown in Figure 5 will exist. The misalignment of the axes is shown at $a$ in this figure. Lifting of the hub of the coupling part C of the driven shaft, during forward drive, will of course compact the discs at the top bolt structure shown in the drawings. This, of course, will necessitate an opening for movement away of the coupling part flanges 13 and 31 at the bottom part of the coupling structure. The discs, of course, flex to take up the angular variations. Since the coupling parts are rotating there exists a constant angular variation between the flanges 13 and 31 and this can occur because of the arrangement of the bolts and the flexing of the discs. The position shown in Figure 5 is for maximum misalignment of the shafting, since the flange of the sleeve of the bottom bolt structure is shown as contacting the adjacent surface of the coupling flange 31.

In Figure 4 is shown the shaft parts and coupling parts arranged where the shafting is in perfect alignment but the drive shaft is reversely driving the driven shaft. Under conditions of reverse thrust the coupling has opened up slightly in the middle. The flanges 13 and 31 are in parallel planes. Under these conditions there will be no relative movement between the various parts of the coupling, since the discs merely flex to permit the coupling parts B and C to move apart. The laminated ring is, of course, distorted from one bolt structure to the adjacent bolt structures; the laminated ring flexing in zig-zag fashion back and forth between the bolt structures. As an incident of reverse drive it will be noted that the bolt flanges 57 receive the thrust thru contact with the coupling part flanges 13 and 31.

Various changes in the shape, size and arrangement of parts may be made to the form of invention herein shown and described, without departing from the spirit of the invention or the scope of the following claims.

I claim:

1. In a flexible coupling for drive and driven shafts permitting angular shaft misalignment, the combination of a pair of shaft connecting coupling parts having portions with transverse aligning openings therein, a flexible disc structure, and bolt means connecting said flexible disc structure with said coupling parts thru the openings of the coupling parts, said bolt means comprising an elongated bolt having a head on one end and a nut on the other, and a flanged sleeve on the bolt between the nut and head of a nature to be clamped by movement of the nut on the bolt against the flexible disc structure and when in such position the flange of said sleeve being spaced slightly from an adjacent contact surface of an adjacent coupling part for contact with said coupling part upon movement of said coupling part along said sleeve away from the other coupling part.

2. In a flexible coupling structure the combination of a pair of shaft coupling connecting parts having laterally extended flanges thereon, the flanges each having large and small transverse openings therein, the flanges being so arranged that each smaller opening of one flange will be aligned with a larger opening of the other flange and vice versa, a laminated laterally flexible disc set, and a bolt structure extending thru each of the aligning small and large openings of said flanges, each bolt structure including an elongated bolt shank threaded at one end and having a head at the other end, a sleeve disposed on the bolt shank between the screw threaded end of the bolt and head, and a nut threaded on the threaded end of the shank, each bolt structure being so arranged that its shank is positioned adjacent to its head end within the smaller opening of one flange and against lateral movement therein with the head of the bolt lying against the outer surface of that flange, said bolt shank extending thru the flexible disc set and thru the larger opening of the other flange, the sleeve lying within the larger opening of said other flange and spaced from the internal surface of the larger opening so as to permit lateral movement of the sleeve within said larger opening, said sleeve projecting beyond the outer side of the outer surface of the flange having the larger opening, said nut being clamped against said sleeve and forcing it into clamped engagement against said disc set with the latter clamped against the disc facing surface of the flange first mentioned, said bolt structure having movement limiting means beyond the outer surface of the coupling flange which has the larger opening spaced from said flange permitting the latter to move to a limited degree relative to said sleeve.

3. In a flexible coupling structure the combination of a pair of shaft coupling connecting parts having laterally extended flanges thereon, the flanges each having large and small transverse openings therein, the flanges being so arranged that each smaller opening of one flange will be aligned with a larger opening of the other flange, and vice versa, a laminated laterally flexible disc set, and a bolt structure extending thru each of the aligning small and large openings of said flanges, each bolt structure including an elongated bolt shank threaded at one end and having a head at the other end, a sleeve disposed on the bolt shank between the screw threaded end of the bolt and the head, and a nut threaded on the threaded end of the shank, each bolt structure being so arranged that its shank is positioned adjacent to its head end within the smaller opening of one flange and against lateral movement therein with the head of the bolt lying against the outer surface of that flange, said bolt shank extending thru the flexible disc set and thru the larger opening of the other flange, the sleeve lying within the larger opening of said other flange and spaced from the internal surface of the larger opening so as to permit lateral movement of the sleeve within said larger opening, said sleeve projecting beyond the outer side of the outer surface of the flange having the larger opening, said nut being clamped against said sleeve and forcing it into clamped engagement against said disc set with the latter clamped against the disc facing surface of the flange first mentioned, said sleeve at the outer end adjacent said nut having an annular flange spaced for a limited distance with respect to the outer surface of the flange having the larger opening to permit limited relative movement of the sleeve thru said larger opening.

4. In a flexible coupling structure the combination of a pair of shaft coupling connecting parts having laterally extended flanges thereon, the flanges each having large and small transverse openings therein, the flanges being so arranged that each smaller opening of one flange will be aligned with a larger opening of the other flange and vice versa, a laminated laterally flexible disc set, and a bolt structure extending thru each of the aligning small and large openings of said flanges, each bolt structure including an elongated bolt shank threaded at one end and having a head at the other end, a sleeve disposed on the bolt shank between the screw threaded end of the bolt and the head, and a nut threaded on the threaded end of the shank, each bolt structure being so arranged that its shank is positioned adjacent to its head end within the smaller opening of one flange and against lateral movement thereon with the head of the bolt lying against the outer surface of that flange, said bolt shank extending thru the flexible disc set and thru the larger opening of the other flange, the sleeve lying within the larger opening of said other flange and spaced from the internal surface of the larger opening so as to permit lateral movement of the sleeve within said larger opening, said sleeve projecting beyond the outer side of the outer surface of the flange having the larger opening, said nut being clamped against said sleeve and forcing it into clamped engagement against said disc set with the latter clamped against the disc facing surface of the flange first mentioned, said sleeve at the outer end adjacent said nut having an extension spaced for a limited distance with respect to the outer surface of the flange having the larger opening to permit limited relative movement of the sleeve thru said larger opening, the flanges each having the larger and smaller openings alternating thereupon so that the bolt structures are alternately arranged in reverse position upon said coupling structure.

5. In a flexible coupling structure the combination of a drive shaft connecting coupling part, a driven shaft connecting coupling part, a set of laterally flexible metal discs, a set of bolts compressively clamping said disc set directly to said drive shaft coupling part, the driven shaft coupling part having openings wherein are loosely received portions of the bolts whereby to permit misalignment of the coupling parts to take place upon deflection of the discs, movement limiting means carried by the bolts having portions spaced from the driven shaft coupling part whereby upon the occurrence of a predetermined degree of end float movement of the coupling parts bodily away from each other endwise and in line with thhe axis of the coupling further movement of the coupling parts axially away from each other is prevented, a second set of bolts spaced circumferentially upon said coupling parts with respect to the bolts first mentioned, said second set of bolts compressively clamping said disc set directly to said driven shaft coupling part, the drive shaft coupling part having openings therein wherein portions of the bolts of the second set are loosely disposed to permit misalignment of the coupling parts to take place upon deflection of the discs, movement limiting means carried by the second set of bolts having portions spaced from the drive shaft coupling part whereby upon the occurrence of a predetermined degree of end float movement of the coupling parts bodily away from each other endwise and in the line of the axis of the coupling further movement of the coupling parts axially away from each other is prevented.

GLENN C. WERNER.

References Cited in the file of this patent

UNITED STATES PATENTS

| Number | Name | Date |
| --- | --- | --- |
| 1,322,128 | Ludeman | Nov. 18, 1919 |
| 2,182,711 | Thomas | Dec. 5, 1939 |
| 2,331,781 | Hollander | Oct. 12, 1943 |